(12) United States Patent
Strohmaier et al.

(10) Patent No.: US 8,494,723 B2
(45) Date of Patent: Jul. 23, 2013

(54) METHOD FOR OPERATING A VEHICLE DISPLAY AND A VEHICLE DISPLAY SYSTEM

(75) Inventors: Jason M. Strohmaier, Dublin, OH (US); Toshiyuki Yasuhara, Dublin, OH (US); Yuki Teramoto, Tokyo (JP); Hiroaki Sakai, Kanagawa (JP)

(73) Assignees: Honda Motor Co., Ltd., Tokyo (JP); Panasonic Corporation, Osaka (JP)

( * ) Notice: Subject to any disclaimer, the term of this patent is extended or adjusted under 35 U.S.C. 154(b) by 395 days.

(21) Appl. No.: 12/701,211

(22) Filed: Feb. 5, 2010

(65) Prior Publication Data
US 2011/0196578 A1 Aug. 11, 2011

(51) Int. Cl.
*G05D 1/00* (2006.01)

(52) U.S. Cl.
USPC ........... 701/48; 701/22; 701/24; 701/31.5; 348/564; 348/565; 348/569; 348/649; 348/563; 345/1.1; 345/173; 345/581; 345/902; 714/27; 714/37; 715/854

(58) Field of Classification Search
USPC ............ 702/22, 48; 348/E9.039, E5.112, 348/565, 569, 564, E5.102, E5.1, 649, 563, 348/589, 705; 345/1.1, 173, 581, 902; 714/27, 714/37, 854; 715/854; 701/22, 24, 31.5, 48
See application file for complete search history.

(56) References Cited

U.S. PATENT DOCUMENTS

| | | | | |
|---|---|---|---|---|
| 4,593,365 A | * | 6/1986 | Haley et al. | 702/46 |
| 4,683,771 A | * | 8/1987 | Sogo et al. | 74/467 |
| 5,757,359 A | * | 5/1998 | Morimoto et al. | 345/156 |
| 6,243,645 B1 | | 6/2001 | Moteki et al. | |
| 6,636,200 B2 | | 10/2003 | Kataoka et al. | |
| 6,806,911 B2 | | 10/2004 | Takemoto | |
| 6,871,121 B2 | * | 3/2005 | Tomson | 701/1 |
| 6,999,875 B2 | * | 2/2006 | Tu | 701/211 |

(Continued)

FOREIGN PATENT DOCUMENTS

| | | |
|---|---|---|
| JP | 200684919 | 3/2006 |
| JP | 200743441 | 2/2007 |
| JP | 200796402 | 4/2007 |

OTHER PUBLICATIONS

International Search Report of PCT/US11/22048 dated Mar. 18, 2011.

(Continued)

*Primary Examiner* — McDieunel Marc
(74) *Attorney, Agent, or Firm* — Rankin, Hill & Clark LLP (57) ABSTRACT

A method for operating a vehicle display includes receiving from a user interface a request to modify a display screen of the vehicle display. In response to the received request to modify, the method can further include displaying a query on the display screen prompting an operator to choose a portion of the display screen that is to be modified. The method can further include receiving an input selection corresponding to a chosen portion of the display screen to be modified. The input selection can be received from the user interface into a control unit in communication with the vehicle display, which is in communication with the control unit. In response to the received input selection, the method can further include displaying an image on the chosen portion of the display screen in accordance with the received request to modify the display screen. A vehicle display system is also provided.

18 Claims, 8 Drawing Sheets

U.S. PATENT DOCUMENTS

| | | | |
|---|---|---|---|
| 7,062,365 B1 * | 6/2006 | Fei | 701/36 |
| 7,443,449 B2 * | 10/2008 | Momosaki et al. | 348/468 |
| 7,640,108 B2 * | 12/2009 | Shimizu et al. | 701/301 |
| 7,739,009 B2 * | 6/2010 | Ozaki | 701/36 |
| 7,773,075 B2 * | 8/2010 | Otsuka et al. | 345/173 |
| 7,904,236 B2 * | 3/2011 | Ueno | 701/200 |
| 7,941,141 B2 * | 5/2011 | Shoykhet et al. | 455/434 |
| 7,995,038 B2 * | 8/2011 | Vitale et al. | 345/173 |
| 2004/0233124 A1 | 11/2004 | Eggers et al. | |
| 2006/0025920 A1 | 2/2006 | Nezu et al. | |
| 2006/0176319 A1 * | 8/2006 | Ida et al. | 345/629 |
| 2007/0216805 A1 | 9/2007 | Yamamoto et al. | |
| 2007/0250867 A1 | 10/2007 | Kuwabara et al. | |
| 2009/0085830 A1 | 4/2009 | Imai et al. | |
| 2009/0102744 A1 * | 4/2009 | Ram | 345/1.1 |
| 2009/0231293 A1 | 9/2009 | Nakayama | |
| 2009/0290369 A1 * | 11/2009 | Schofield et al. | 362/494 |
| 2010/0165200 A1 | 7/2010 | Kataoka et al. | |
| 2010/0188312 A1 | 7/2010 | Ohdachi et al. | |
| 2011/0109555 A1 * | 5/2011 | Miller | 345/167 |

OTHER PUBLICATIONS

Written Opinion of PCT/US11/22048 dated Mar. 18, 2011.

* cited by examiner

METHOD FOR OPERATING A VEHICLE DISPLAY AND A VEHICLE DISPLAY SYSTEM

This disclosure is directed to vehicle display systems and methods of operating such vehicle display systems.

BACKGROUND

Displays, e.g., LED display panels, LCD display panels, plasma display panels, and the like, are often found in vehicles to display information about the vehicle. For example, vehicle information (e.g., miles or kilometers per hour), navigation information (e.g., driving directions), and HVAC information can be presented on the aforementioned vehicle display. Vehicle displays are also connected with audio and video systems found in the vehicle. With so many vehicle systems being able to connect to vehicle displays, these displays are capable of presenting a vast amount of information and images.

Since not all of the information and images that are capable of being presented on a vehicle display can be presented on the vehicle display at the same time in a manner that can be easily viewed by a passenger, it can be desirable to allow an operator of the display to choose what is being presented on the display. Some known vehicle display systems allow the operator to display images from different sources. For example, vehicle navigation system information can be presented on the display screen of the display along with images emanating from a DVD player. This known display system, however, defaults to the navigation information being presented when the images from the DVD player are no longer being sent to the vehicle display.

Other vehicle display systems allow the display screen to present images from multiple sources, e.g., different video feeds can be presented on the same display screen. These display systems, however, are not intuitive in allowing the operator to change the information being presented on the display.

SUMMARY

A method for operating a vehicle display in a vehicle that can overcome at least some of the aforementioned shortcomings includes receiving from a user interface a request to modify a display screen of the vehicle display. In response to the received request to modify, the method can further include displaying a query on the display screen prompting an operator to choose a portion of the display screen that is to be modified. The method can further include receiving an input selection corresponding to a chosen portion of the display screen to be modified. The input selection can be received from the user interface into a control unit in communication with the vehicle display, which is in communication with the control unit. In response to the received input selection, the method can further include displaying an image on the chosen portion of the display screen in accordance with the received request to modify the display screen.

A vehicle display system that can overcome at least some of the aforementioned shortcomings includes a display, a control unit in communication with the display, a user interface in communication with the control unit, and a plurality of vehicle systems in communication with the control unit. The display includes a display screen. The display is configured to present a first screen and a second screen adjacent the first screen on the display screen. The control unit can be configured to communicate with the display to present an image associated with at least one of the plurality of the vehicle systems. The control unit can also be configured to present a prompt on the display in response to receiving a request from the user interface to change which vehicle system is associated with the display at a given point in time.

DETAILED DESCRIPTION

Figure 1:
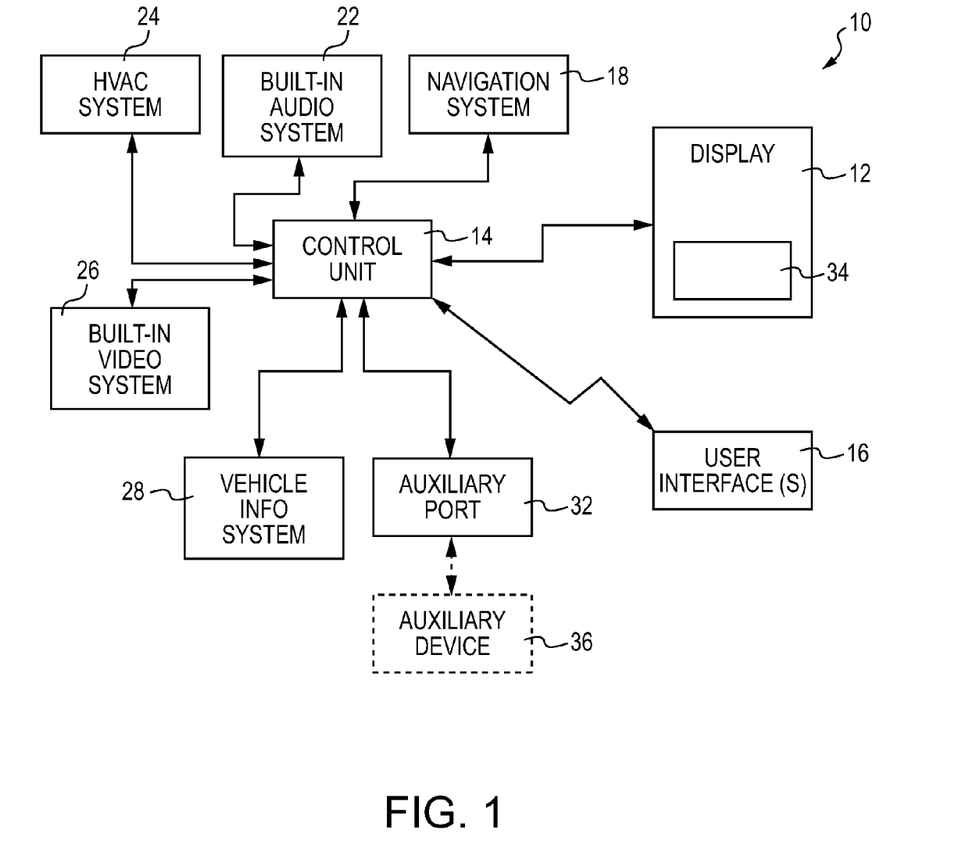
FIG. 1 is a schematic depiction of a vehicle display system.

The following is a description of a method for operating a vehicle display and a vehicle display system. An example of such a system is described with reference to FIG. 1 so that one of ordinary skill in the art may construct the system, however, the appended claims are not limited only to the system described herein. With reference to FIG. 1, a diagram is provided in block form for showing the flow of information in a vehicle display system 10. The diagram in FIG. 1 is provided for the purpose of explaining interrelationships between various data in the display system 10, and the appended claims are not limited to the arrangement shown. The vehicle display system 10 depicted in FIG. 1 includes a display 12, a control unit 14 in communication with the display, a user interface 16 in communication with the control unit, and a plurality of vehicle systems in communication with the control unit. The plurality of vehicle systems can include a navigation system 18, a built-in audio system 22, an HVAC system 24, a built-in video system 26, a vehicle information system 28, and an auxiliary port 32.

In the illustrated embodiment, the display 12 can be an LED display panel, an LCD display panel, a plasma display panel, a CRT display, and the like. The display 12 mounts inside a vehicle cabin (not shown). The display can be mounted at many locations within the vehicle cabin, such as on the dashboard, to the roof, behind the first row seats, as well as other locations within the vehicle cabin.

The display 12 depicted in FIG. 1 includes a display screen 34. The display screen 34 can be designed and manufactured to present multiple screens each associated with a different vehicle system. For example, and as more clearly seen in FIG. 4D, the display 12 can be configured to present a first screen, which for the sake of brevity and ease of understanding the figures will be referred to as a left screen 34L, and a second screen, which for the sake of brevity and ease of understanding the figures will be referred to as a right screen 34R, adjacent the first screen on the display screen.

Figure 4A:
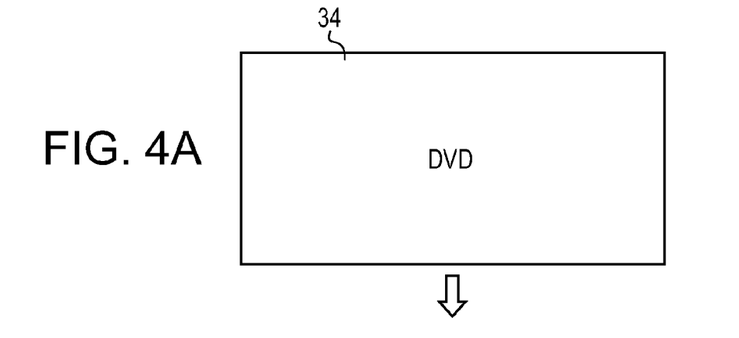
FIG. 4 is a schematic depiction showing different screen shots of a display screen of the vehicle display progressing through the method for operating the vehicle display depicted in FIG. 3.
Figure 4B:
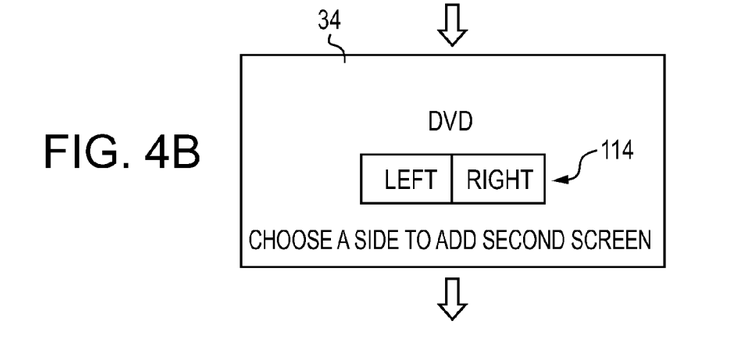
Figure 4C:
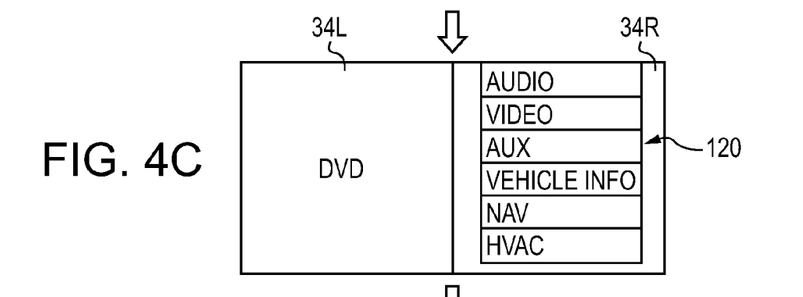
Figure 4D:
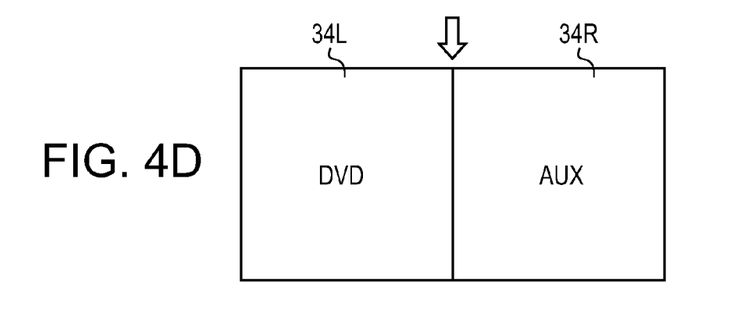

Both the display 12 and the control unit 14 are configured to operate the display in a single screen mode (see FIG. 4A) and a dual screen mode (see FIG. 4D). When in the single screen mode, the display screen 34 is associated with one of the plurality of the vehicle systems and presents an image from this vehicle system on the screen while the single screen is typically centered. In the example illustrated in FIG. 4A, the display screen 34 is in a single screen mode where the display screen is associated with the built-in video system 26 (FIG. 1), which can be a DVD player. In this example, the image associated with the display screen 34 is an image provided by the built-in video system 26 (FIG. 1), which is sent to the display 12 via the control unit 14 to be presented on the display screen 34. With reference to FIG. 4D, the display screen is shown in a dual screen mode where the left screen 34L is positioned adjacent the right screen 34R. In the embodiment illustrated in FIG. 4D, the left screen 34L is associated with one of the plurality of vehicle systems, e.g., the built-in video system 26 (FIG. 1) and the right screen 34R is associated with another of the plurality of vehicle systems, e.g., the navigation system 18 (FIG. 1). For the screen shot shown in FIG. 4D, an image provided by the built-in video system is displayed on the left screen 34L and an image provided by the control unit 14 based on information derived from the navigation system 18 (FIG. 1) is displayed on the right screen 34R. Further information regarding the operation of the display 12 and the presentation of images on the display screen 34 will be provided below. The image that is presented on the display screen that is associated with the respective vehicle systems can be one of a plurality of images that are presented on the display screen 34. Also, when operating in the single screen mode, the screens that are referred to as the left screen 34L and the right screen 34R while operating in the dual screen mode are associated with one of the plurality of vehicle systems so as to operate as a single screen.

The control unit 14 is configured to communicate with the display 12 to present an image associated with at least one of the plurality of vehicle systems, e.g., the navigation system 18, the built-in audio system 22, the HVAC system 24, the built-in video system 26, the vehicle information system 28, and the auxiliary port 32. The control unit 14 is also configured to present a prompt on the display screen in response to receiving a request from the user interface 16 to change which vehicle system, among the plurality of the aforementioned vehicle systems, is to be associated with the display 12 at a given point in time. The control unit 14 can include appropriate processors, circuitry, hardware and/or software, each of which are known in the art, to perform the aforementioned functions.

The user interface 16 communicates with the display 12 via the control unit 14. The user interface 16 can include a remote control unit including a plurality of buttons, keys, cursor controls and/or switches that can allow an operator to input commands for operating the plurality of the vehicle systems that are in communication with the control unit. The user interface 16, or an additional user interface, can also be mounted inside the vehicle cabin and include similar buttons, keys, cursor controls (e.g. a trackball) and/or switches to allow an operator to control the aforementioned plurality of vehicle systems that are in communication with the control unit 14 by manipulating the user interface.

The plurality of vehicle systems that are in communication with the control unit 14, and thus the display 12 via the control unit, can be similar to known vehicle systems. In the example of the display system 10 shown in FIG. 1, many of the vehicle systems are "built-in," which can mean that these systems are installed prior to an operator of the vehicle purchasing the vehicle. The auxiliary port 32 can allow external auxiliary devices 36, such as a video game console, a computer, or a similar device that communicates with a video display, to communicate with the display 12 via the control unit 14. The auxiliary port 32 can include input ports similar to known cable jacks, RCA jacks, HDMI cable ports, USB ports, a wireless input port and the like.

Figure 2:
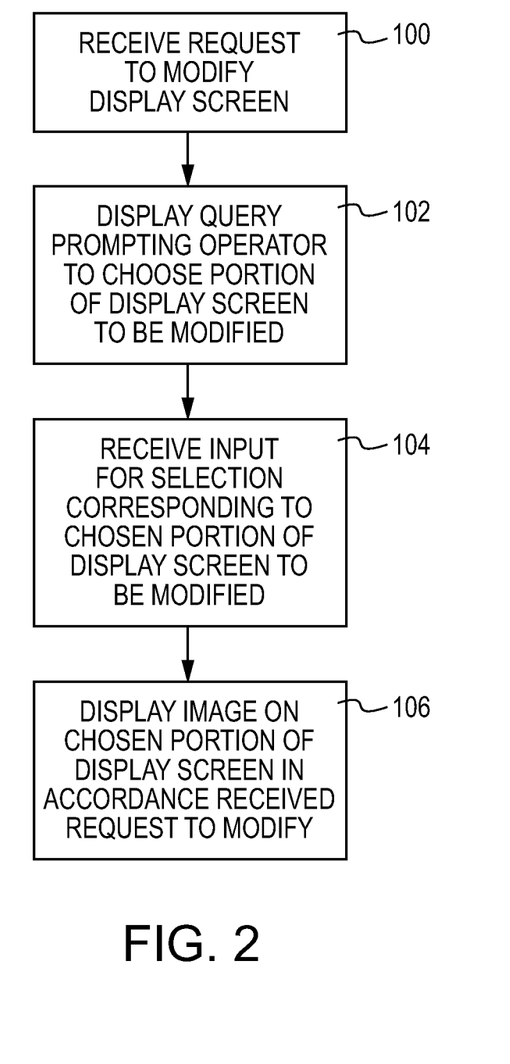
FIG. 2 is a flow diagram depicting a method for operating a vehicle display.

With reference to FIG. 2, a flow chart depicting a method for operating a vehicle display in a vehicle is shown. The flow chart, along with the other flow charts provided herein, are provided for understanding embodiments of a method for operating a vehicle display; however, the appended claims are not limited to the arrangement of the steps shown in any of the figures. Additionally, the method for operating the vehicle display described in FIGS. 2, 3, 5 and 7 will be described with reference to the vehicle system 10 shown in FIG. 1. Nevertheless, the method for operating a vehicle display in a vehicle can be utilized with other vehicle display systems.

With reference to FIG. 2, an example of a method for operating a vehicle display can include, at 100, receiving a request to modify the display screen 34 (FIG. 1) of the vehicle display 12 (FIG. 1) from the user interface 16 (FIG. 1). The request to modify is received into the control unit 14 (FIG. 1), which is in communication with the display 12 (FIG. 1). In response to the received request to modify the display screen 34 (FIG. 1) of the vehicle display 12 (FIG. 1), the method for operating the vehicle display in a vehicle can further include, at 102, displaying a query (described in more detail below) on the display screen prompting an operator to choose a portion of the display screen that is to be modified. The method for operating the vehicle display can further include, at 104, receiving an input selection corresponding to a chosen portion of the display screen 34 that is to be modified. The input selection can be received from the user interface 16 (FIG. 1) into the control unit 14 (FIG. 1), which is in communication with the vehicle display 12. As mentioned above, the vehicle display 12 (FIG. 1) is also in communication with the control unit 14 (FIG. 1). In response to the received input selection, the method for operating the vehicle display 12 can also include, at 106, displaying an image on the chosen portion of the display screen 34 (FIG. 1) in accordance with the received request to modify the display screen.

Figure 3:
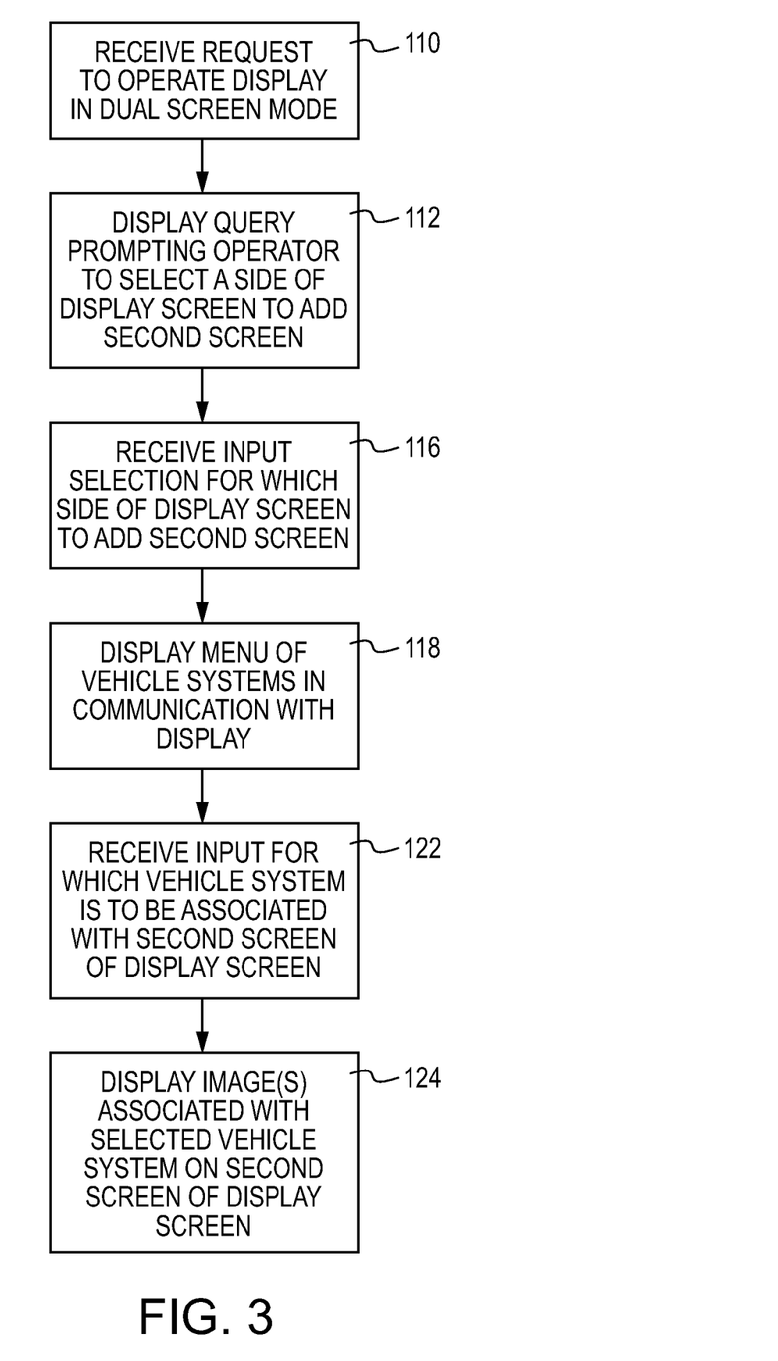
FIG. 3 is a flow diagram depicting a method for operating a vehicle display where the display is changing from operating in a single screen mode to operating in a dual screen mode.

A more specific example of a method for operating the vehicle display 12 (FIG. 1) is depicted by the flow chart in FIG. 3 and the screen shots depicted FIGS. 4A-4D. FIG. 3 depicts a method for operating the vehicle display 12 (FIG. 1) in a vehicle where the display is operating in a single screen mode (see FIG. 4A) and the operator desires to change the display screen 34 (FIG. 1) so that the display operates in a dual screen mode. With reference to FIG. 4A, when operating in the single screen mode, the display screen 34 presents an image associated with a first vehicle system, e.g. the built-in video system 26 (FIG. 1) of a plurality of vehicle systems in communication with the control unit 14. For example, the display screen can be presenting images stored on a DVD and can be displaying, for example, a movie on the display screen 34.

In the method for operating the vehicle display 12 (FIG. 1) depicted in FIG. 3, at 110, a request initiated by the operator of the display system 10 using the user interface 16 (FIG. 1) is received in the control unit 14 (FIG. 1) to operate the display 12 (FIG. 1) in a dual screen mode. By changing the display 12 so that it operates in a dual screen mode, the display screen 34 can present an image associated with at least two vehicle systems of the plurality of vehicle systems. The operator can initiate the request to change from a single screen mode to a dual screen mode by depressing a button, which operates a switch, on the user interface 16 (FIG. 1). For example, the button could be labeled "DUAL," which can indicate to the operator of the user interface that this button controls a switch, or other signal generator, to send a signal to the control unit 14 (FIG. 1) to operate in the dual screen mode.

With continued reference to FIG. 3, at 112, the method further includes displaying a query 114 (FIG. 4B) prompting the operator to select a side of the display screen 34 to add a second screen. An example of such a query can be found in FIG. 4B, which depicts the query as "Choose a side to add second screen." The query, however, can be worded otherwise and can be presented in different languages. The query 114 also includes a first box in which the word "left" is positioned inside the first box and a second box that includes the word "right" positioned within the second box. The query 114 is presented in response to the received request to operate the display in dual screen mode.

With reference back to FIG. 3, the method for operating the vehicle display 12 (FIG. 1) can also include, at 116, receiving an input selection corresponding to a selected side of the display screen 34 where the second screen is to be added. With reference back to FIG. 4B, the display screen 34 can also display an indication where the operator can select whether the second screen is to be positioned on the left side or the right side of the display screen 34. If desired, the second screen could also be displayed above or below the first screen, which could require different images to be displayed on the display screen, such as the words "UPPER" or "LOWER," or even arrows could be used to depict the location of the second screen. The operator, using the user interface 16 (FIG. 1), selects where the second screen is to be added, for example by maneuvering a cursor control using the user interface, and this input is received into the control unit 14 (FIG. 1).

With reference back to FIG. 3, at 118, the method for operating the vehicle display 12 (FIG. 1) can further include displaying a menu 120 on the selected side of the display screen 34, which as depicted in FIG. 4C is the right screen 34R. The menu 120 can include a listing of the plurality of vehicle systems, e.g. the navigation system 18, the built-in audio system 22, the HVAC system 24, the built-in video system 26, the vehicle information system 28, and the auxiliary port 32, that are each in communication with the display 12 via the control unit 14. In the example depicted in FIG. 4A-4D, since the operator chose the right screen 34R to be added, the image that was displayed in the single screen mode (shown in FIG. 4A) is shifted to the left screen 34L.

With reference back to FIG. 3, the method for operating the vehicle display 12 (FIG. 1) can further include, at 122, receiving input for which vehicle system is to be associated with the second screen of the display screen. With reference to FIG. 4C, an operator of the user interface 16 can select a second vehicle system, which in the embodiment depicted in FIG. 4D is the auxiliary device 36 via the auxiliary port 32 (FIG. 1). The operator of the user interface 16 (FIG. 1) can manipulate the user interface to maneuver a cursor control to select the desired vehicle system that is to be associated with the second screen that is to be added to the display screen 34 so that the display screen operates in a dual screen mode. Alternatively, the user interface 16 (FIG. 1) can include buttons, keys and/or switches that when actuated communicate with the control unit 14 to associate the selected vehicle system with the second screen that is to be added to the display screen 34 so that the display screen changes from the single screen mode (FIG. 4A) to a dual screen mode (FIG. 4D).

With reference back to FIG. 3, the method for operating the vehicle display 12 can further include, at 124, displaying an image associated with the selected vehicle system on a second screen of the display screen. This image can be displayed in response to the received input corresponding to the selected vehicle system. For example, with reference to FIGS. 4C and 4D, an operator of the user interface 16 (FIG. 1) can select a second vehicle system, e.g. the auxiliary device 36 (FIG. 1), to be displayed in the second screen that is to be added to the display screen. Even though the auxiliary device 36 is depicted as being associated with the second screen 34R, any of the aforementioned vehicle systems described above and found in the menu 120 can be associated with the second vehicle screen when the operator selects one of the aforementioned vehicle systems. When changing into the dual screen mode, the image that was presented on the display screen 34 while in the single screen mode is shifted to the unselected screen, which in this instance would be the left screen 34L.

As discussed above the image associated with each of the vehicle screens in FIG. 4D, e.g. the left screen 34L or the right screen 34R, can display images provided by the respective vehicle system. For example, a DVD player, which can be a part of the built-in video system 26 (FIG. 1), can provide images to the left hand screen 34L (these images were already being presented in while in the single screen mode). Instead of being provided by the respective vehicle system, i.e. instead of being provided by a DVD found in a DVD player, the images provided to each of the screens can also be provided by the control unit 14 based on information derived from a respective vehicle system. For example, the vehicle information system 28 can provide data to the control unit 14, such data can include the speed at which the vehicle is traveling and the amount of fuel remaining in the fuel tank, which can be displayed on the display 34 in either of the first screen 34L or the second screen 34R. As seen in FIG. 4D, the first screen 34L and the second screen 34R are similar in size and dimensions. If desired, one of the screens can be larger than the other screen.

Figure 5:
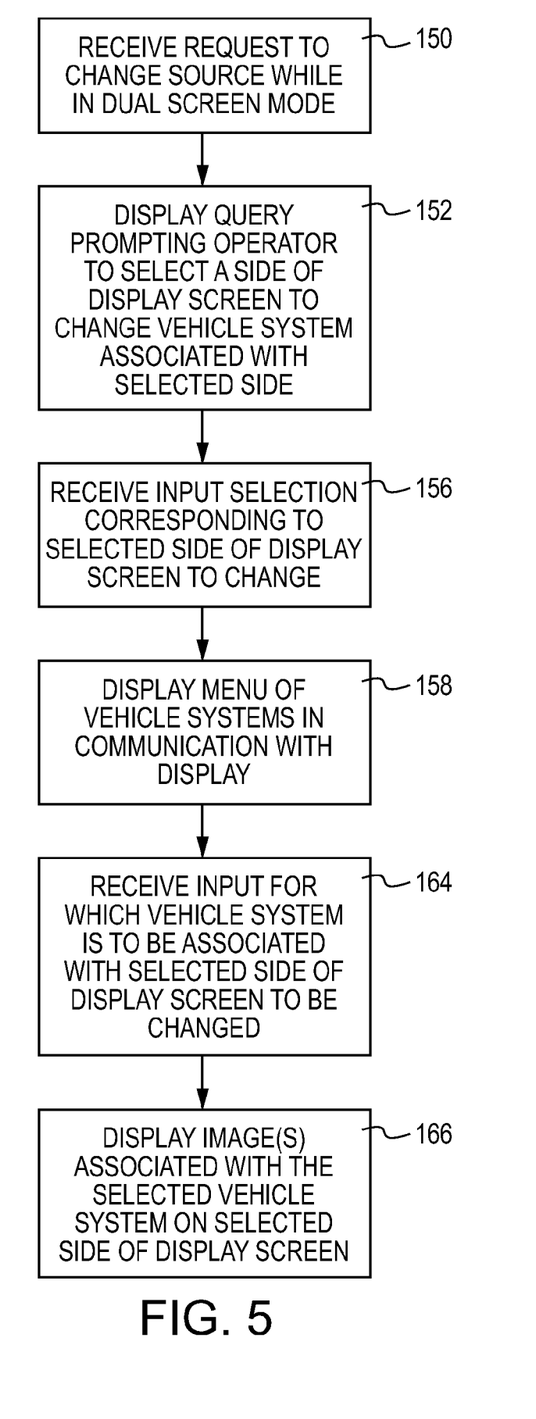
FIG. 5 is another flow diagram depicting a method for operating a vehicle display where the display is operating in a dual screen mode and is changing a vehicle system associated with one of the screens.

Another more specific example of a method for operating the vehicle display 12 (FIG. 1) is depicted by the flow chart in FIG. 5 and the screen shots depicted FIGS. 6A-6D. FIG. 5 depicts a method for operating the vehicle display 12 (FIG. 1) in a vehicle where the display 12 (FIG. 1) is operating in a dual screen mode (see FIG. 6A) and the operator desires to change the vehicle system, or the source, associated with one of the display screens 34L or 34R. When operating in the dual screen mode, the display screen presents an image associated with a first vehicle system, e.g. the built-in video system 16 (FIG. 1), of a plurality of vehicle systems on one of the screens 34L, for example, and the display screen presents an image associated with a second vehicle system, e.g. the auxiliary port 32 (or the auxiliary device 36 connected with the auxiliary port), on the other screen 34R, for example.

With reference to FIG. 5, the method for operating the vehicle display 12 (FIG. 1) can include, at 150, receiving a request to change the vehicle system that is associated with at least one of the first screen 34L (FIG. 6A) and the second screen 34R (FIG. 6A) of the display screen while in the dual screen mode. For example, an operator of the user interface 16 can activate a switch, which can be operated by a key on the user interface, to indicate that the user wishes to change one of the vehicle systems that is associated with at least one of the screens being displayed on the display screen. For example, such a key located on the user interface 16 (FIG. 1) can be labeled "CHANGE SOURCE."

With continued reference to FIG. 5, the method for operating the vehicle display 12 (FIG. 1) can further include, at

Figure 6A:
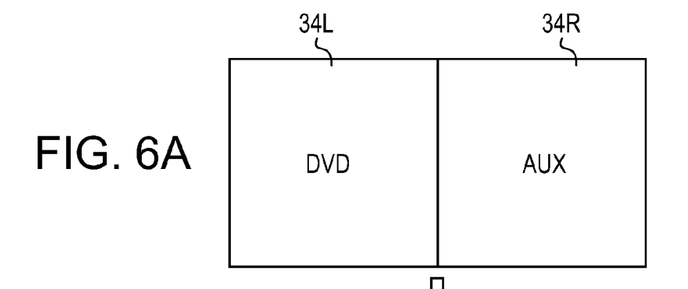
FIG. 6 is a schematic depiction showing different screen shots of the display screen of the vehicle display progressing through the method shown in FIG.
Figure 6B:
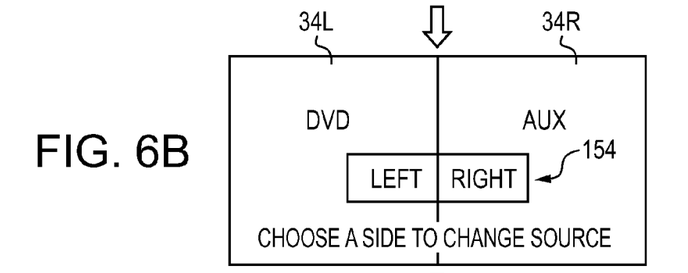

152, displaying a query 154 (FIG. 6B) prompting the operator to select a screen, e.g. screen 34L or screen 34R, of the display screen that is to change the vehicle system that is associated with the selected screen of the display. With reference to FIG. 6B, for example, a query 154 is presented on the display screen 34 that includes the words "Choose a side to change source." Similar to the method described above, the query 154 also includes a box in which the word "left" is positioned inside the box and a box that includes the word "right" positioned within the box. An operator of the user interface 16 can use the cursor control to select the "left" box or the "right" box to select the selected screen of the display that is to change.

With continued reference to FIG. 5, the method for operating a vehicle display in a vehicle can include, at 156, receiving an input selection corresponding to the selected side of the display screen that is to change. For example, as seen in FIG. 6B the display screen 34 can display the query 154 where the operator is to choose a side of the display screen that is to change the vehicle system associated with that side. The operator of the user interface 16 can maneuver a cursor control to select which side of the display screen is to change and this input can be received into the control unit 14.

Figure 6C:
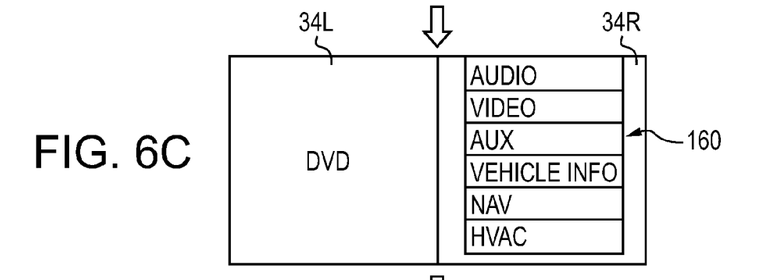
Figure 6D:
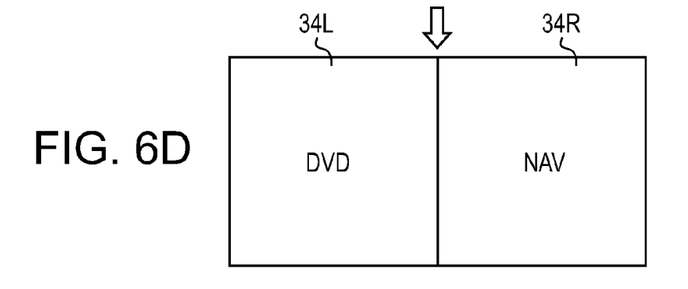

The method for operating a vehicle display can further include, at 158, displaying a menu 160 on the selected screen, which was selected at 156, of the display screen. The menu 160 includes the plurality of vehicle systems in communication with the display 12 (FIG. 1) via the control unit 14 (FIG. 1). With reference to FIG. 6C, the menu 160 is displayed on the right screen 34R. This is an indication that the operator of the user interface 16 chose the right side of the display screen to change the vehicle system associated with this display screen. The menu 160 lists the plurality of vehicle systems that are in communication with the control unit 14 and are associated with the display 12. From this menu 160, or listing of the vehicle systems, an operator of the user interface 16 can select a vehicle system that is to be associated with the selected side of the vehicle display by maneuvering a cursor control using the user interface 16. If desired, the menu 160 can be presented over what is presently being displayed on the selected side of the display screen. For example, where the right screen 34R had been displaying images associated with the auxiliary port 32, via images being provided by the auxiliary device 36 (FIG. 1), these images can remain being displayed behind the menu 160.

With reference back to FIG. 5, the method for operating a vehicle display can further include, at 164, receiving input corresponding to a selected vehicle system of the plurality of vehicle systems that is to be in communication with the selected screen of the display screen that is to change. With reference back to FIG. 6C, an operator of the user interface 16 selects the vehicle system that is to be associated with the portion of the display screen that is to change by maneuvering a cursor control to the desired vehicle system and selecting this vehicle system, e.g., by depressing a button or switch. This input from the operator is received in the control unit 14.

With reference back to FIG. 5, the method for operating a vehicle display can further include, at 166, in response to the received input corresponding to the selected vehicle system, displaying an image associated with the selected vehicle system on the selected screen of the display screen. For example, with reference to FIG. 6D, images associated with the navigation system can be displayed on the right display screen 34R in response to an operator selecting "NAV" on the menu 160 and in response to the operator selecting the right screen 34R.

With reference back to FIG. 1, the display 12, the control unit 14, and the user interface 16 can each be configured to allow the operator of the display system 10 to select which screen, where two screens are being displayed in a dual screen mode, will remain when the operator desires to change from the dual screen mode to the single screen mode. FIGS. 7 and 8A-8C depict an example of operating the vehicle display where the display screen is first being operated in a dual screen mode such as that shown in FIG. 8A. When operating in the dual screen mode, the display screen 34 presents an image associated with a first vehicle system, e.g., the built-in video system 26 (FIG. 1) which is shown as "DVD" in FIG. 8A. When operating in the dual screen mode, the display screen also presents an image associated with a second vehicle system, e.g., the auxiliary port 32 and auxiliary device 36 connected to the auxiliary port (FIG. 1).

Figure 7:
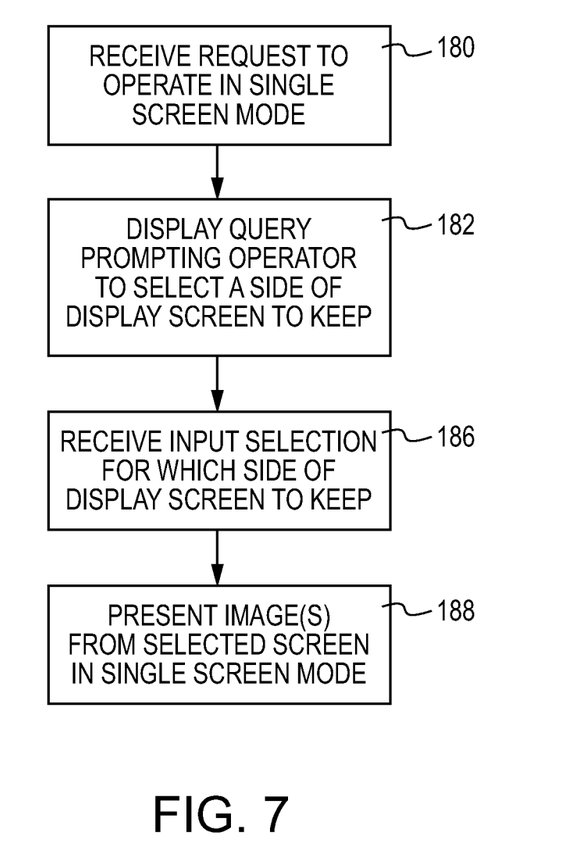
FIG. 7 is a flow diagram depicting another method for operating a vehicle display where the display screen is changing from operating in a dual screen mode to operating in a single screen mode.
Figure 8A:
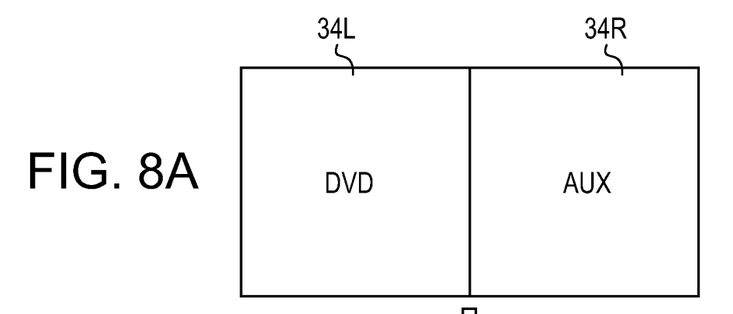
FIG. 8 is a schematic depiction showing different screen shots of the display screen progressing through the method for operating the vehicle display depicted in FIG. 7.
Figure 8B:
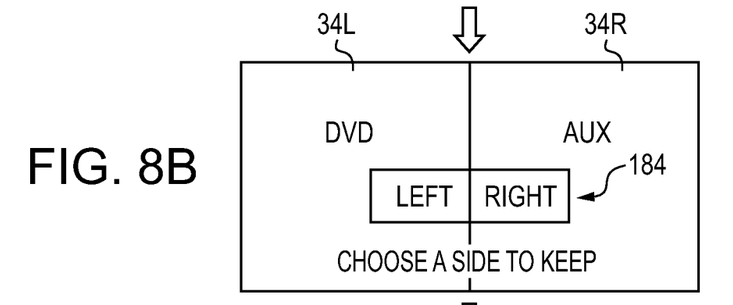
Figure 8C:
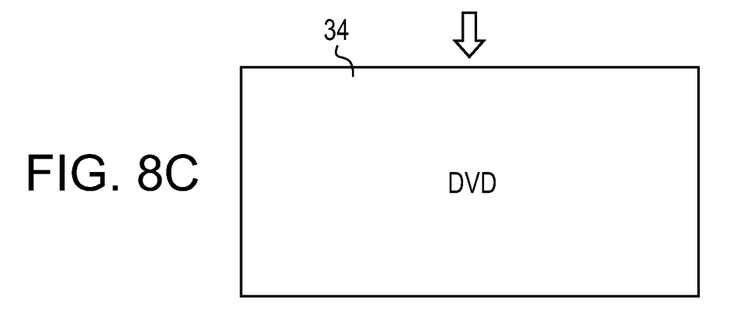

With reference to FIG. 7, another more specific example of a method for operating the vehicle display is depicted. At 180, the control unit 14 can receive a request to operate in the single screen mode while operating in the dual screen mode. The request is received into the control unit 14 (FIG. 1) from the user interface 16 (FIG. 1) by the operator of the user interface depressing a button or manipulating the user interface in such a manner so that the user interface delivers a signal to the control unit that indicates that the operator of the control unit desires to change from the dual screen mode, which is shown in FIG. 8A, to the single screen mode, which is shown in FIG. 8C.

The method for operating a vehicle display can further include, at 182, displaying a query 184 (FIG. 8B) on the display screen prompting the operator to select a side of the display screen to keep. For example, a query can be displayed prompting the operator to select the first screen, e.g., the left screen, or the second screen, e.g., the right screen to keep. Alterations to the query 184 shown in FIG. 8B can also be made, for example the wording of the query could be changed while still providing an operator of the user interface 16 an indication that a selection is to be made as to which side of the display screen is to remain when entering into the single screen mode.

The method for operating the vehicle display can further include, at 186, receiving an input selection for a selected screen of the display screen to keep. With reference back to FIG. 8B, for example an operator of the user interface 16 can select the left side of the vehicle screen to keep such that the left side would then be centered on the display screen such as that shown in FIG. 8C. Accordingly, the method for operating the vehicle display would, at 188, present images from the selected screen in a single screen mode.

The aforementioned display system 10 and methods allow an operator of the display system to allow different sources, or vehicle systems, to display images on a display screen. The display system and methods are intuitive for an operator to select which screens to add, keep or change.

A method for operating the vehicle display has been described with particularity. Modifications and alterations will occur to those upon reading and understanding the preceding detailed description. The invention, however, is not limited only to the embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for operating a vehicle display in a vehicle, the method comprising:
    operating a display screen of the vehicle display in a single screen mode or in a dual screen mode, when in each mode the display screen presents at least one image associated with a respective vehicle system of a plurality of vehicle systems in communication with a control unit, which is in communication with the vehicle display, wherein each vehicle system is at least one of a built-in audio unit, a built-in video unit, an auxiliary port in communication with the control unit, a vehicle information system, a navigation system and an HVAC system;
    receiving by the control unit a request from a user interface to modify the mode in which the display screen is operating;
    in response to the received request to modify, displaying a query on the display screen prompting an operator to choose a portion of the display screen that is to be modified;
    receiving an input selection corresponding to a chosen portion of the display screen to be modified, wherein the input selection is received from the user interface into the control unit; and
    in response to the received input selection, displaying an updated image on the chosen portion of the display screen in accordance with the received request to modify the display screen.

2. A method for operating a vehicle display in a vehicle, the method comprising:
    operating a display screen of the vehicle display in a single screen mode wherein the display screen presents an image associated with a first vehicle system of a plurality of vehicle systems in communication with a control unit, which is in communication with the vehicle display;
    receiving by the control unit a request from a user interface to operate the display in a dual screen mode wherein the display screen presents at least two images, each image being associated with a respective vehicle system of the plurality of vehicle systems;
    displaying a query prompting the operator to select a side of the display screen to add a second screen;
    receiving by the control unit an input selection from the user interface, the input selection corresponding to a selected side of the display screen where the second screen is to be added; and
    displaying a menu on the selected side of the display screen, wherein the menu includes the plurality of vehicle systems in communication with the display.

3. The method of claim 2, wherein the plurality of vehicle systems includes at least one of the following: a built-in audio unit, a built-in video unit, an auxiliary port in communication with the control unit, a vehicle information system, a navigation system and an HVAC system.

4. The method of claim 3, further comprising:
    receiving input corresponding to a second vehicle system of the plurality of vehicle systems that is to be associated with the second screen of the display screen; and
    in response to received input corresponding to the second vehicle system, displaying a second image associated with the second vehicle system on the second screen of the display screen and displaying a first image associated with the first vehicle system on a first screen that is adjacent the second screen.

5. The method of claim 4, wherein displaying a second image associated with the second vehicle system includes displaying images provided by the second vehicle system.

6. The method of claim 4, wherein displaying a second image associated with the second vehicle system includes displaying images provided by the control unit based on information derived from the second vehicle system.

7. The method of claim 4, wherein the first screen and the second screen are similar in size and dimensions.

8. A method for operating a vehicle display in a vehicle, the method comprising:
    operating a display screen in a dual screen mode wherein the display screen presents a first image associated with a first vehicle system of a plurality of vehicle systems on a first screen of the display screen and presents a second image associated with a second vehicle system of the plurality of vehicle systems on a second screen of the display screen, wherein each vehicle system is at least one of a built-in audio unit, a built-in video unit, an auxiliary port in communication with the control unit, a vehicle information system, a navigation system and an HVAC system;
    receiving by the control unit a request from the user interface to change the vehicle system that is associated with at least one of the first screen and the second screen of the display screen while in the dual screen mode;
    displaying a query prompting the operator to select a screen of the display screen that is to change the vehicle system that is associated with the selected screen of the display;
    receiving by the control unit an input selection from the user interface corresponding to the selected screen of the display screen that is to change; and
    displaying a menu on the selected screen of the display screen, wherein the menu includes the plurality of vehicle systems.

9. The method of claim 8, further comprising:
    receiving input corresponding to a selected vehicle system of the plurality of vehicle systems that is to be in communication with the selected screen of the display screen that is to change; and
    in response to received input corresponding to the selected vehicle system, displaying an image associated with the selected vehicle system on the selected screen of the display screen.

10. The method of claim 9, wherein displaying an image associated with the selected vehicle system includes displaying an image provided by at least one of the vehicle systems.

11. The method of claim 9, wherein displaying an image associated with the selected vehicle system includes displaying an image provided by the control unit based on information derived from at least one of the vehicle systems.

12. The method of claim 8, wherein the first screen and the second screen are similar in size and dimensions.

13. A method for operating a vehicle display in a vehicle, the method comprising:
    operating a display screen in a dual screen mode wherein the display screen presents a first image associated with a first vehicle system of a plurality of vehicle systems on a first screen of the display screen and presents a second image associated with a second vehicle system of the plurality of vehicle systems on a second screen of the display screen, wherein each vehicle system is at least one of a built-in audio unit, a built-in video unit, an auxiliary port in communication with the control unit, a vehicle information system, a navigation system and an HVAC system;

receiving by the control unit a request from a user interface to operate the display in a single screen mode while operating in the dual screen mode;

displaying a query prompting the operator to select the first screen or the second screen of the display screen to keep;

receiving an input selection for a selected screen of the display screen to keep; and displaying an updated image on the display screen in the single screen mode, wherein the updated image is associated with the vehicle system that was associated with the selected kept screen.

14. The method of claim 13, wherein displaying an updated image on the display screen includes displaying the updated image, which is provided by the vehicle system that was associated with the selected kept screen in the single screen mode.

15. The method of claim 13, wherein displaying an updated image on the display screen includes displaying the updated image, which is provided by the control unit based on information derived from the vehicle system that was associated with the selected kept screen in the single screen mode.

16. The method of claim 13, wherein a display area of the display screen when in the single screen mode is larger than a display area of the first screen or the second screen.

17. A vehicle display system including:

a display including a display screen, wherein the display is configured to present a first screen and a second screen adjacent the first screen on the display screen;

a control unit in communication with the display;

a user interface in communication with the control unit; and a plurality of vehicle systems in communication with the control unit, wherein the display and the control unit are configured to operate the display screen in a single screen mode where the first screen and the second screen are associated one of the plurality of vehicle systems operating as a single screen;

wherein the display and the control unit are configured to operate the display screen in a dual screen mode where the first screen is positioned adjacent the second screen and the first screen is associated with one of the plurality of vehicle systems and the second screen is associated with another of the plurality of vehicle systems;

wherein the control unit is configured to communicate with the display to present an image associated with at least one of the plurality of vehicle systems and to present a prompt on the display screen in response to receiving a request from the user interface to change a respective mode in which the display screen is operating.

18. The system of claim 17, wherein the plurality of vehicle systems includes at least two of a built-in audio unit, a built-in video unit, an auxiliary port in communication with the control unit, a vehicle information system, a navigation system and an HVAC system.

* * * * *